(12) United States Patent
Aguera et al.

(10) Patent No.: US 12,077,275 B2
(45) Date of Patent: Sep. 3, 2024

(54) AIRCRAFT COMPRISING AT LEAST ONE SYSTEM RACK CONNECTED TO A FLOOR RAIL BY AT LEAST ONE CONNECTING SYSTEM

(71) Applicant: Airbus Operations SAS, Toulouse (FR)

(72) Inventors: Damien Aguera, Toulouse (FR); Matthieu De Kergommeaux, Labege (FR); Salim Chalqi, Toulouse (FR); Gaspard Supan, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 78 days.

(21) Appl. No.: 18/082,121

(22) Filed: Dec. 15, 2022

(65) Prior Publication Data
US 2023/0192269 A1    Jun. 22, 2023

(30) Foreign Application Priority Data
Dec. 17, 2021 (FR) ........................ 2113823

(51) Int. Cl.
*B64C 1/20* (2006.01)
(52) U.S. Cl.
CPC .................... *B64C 1/20* (2013.01)
(58) Field of Classification Search
CPC .......... B64C 1/18; B64C 1/068; B64C 1/0683
See application file for complete search history.

(56) References Cited

U.S. PATENT DOCUMENTS

| | | | | |
|---|---|---|---|---|
| 8,544,789 B2* | 10/2013 | Gallant | ..................... | F16F 1/38 |
| | | | | 244/38 |
| 8,915,470 B2* | 12/2014 | Bernadet | ................ | B64D 11/00 |
| | | | | 244/119 |
| 9,216,809 B2* | 12/2015 | Guering | ................. | B64D 13/00 |
| 9,290,259 B2* | 3/2016 | Durand | ................. | B64D 43/00 |
| 9,351,412 B2* | 5/2016 | Durand | ................. | B64D 43/00 |
| 9,359,084 B2* | 6/2016 | Durand | ................. | B64D 43/00 |
| 9,764,816 B2* | 9/2017 | Dazet | ...................... | B64C 1/069 |
| 9,878,790 B2* | 1/2018 | Burgunder | ................ | B64C 9/24 |
| 10,046,845 B2* | 8/2018 | Dazet | ...................... | B64C 1/062 |
| 11,279,470 B2* | 3/2022 | Murray | .................. | B64C 1/061 |

(Continued)

FOREIGN PATENT DOCUMENTS

FR        3000031 A1    6/2014

OTHER PUBLICATIONS

French Search Report dated Jul. 21, 2022; priority document.

*Primary Examiner* — Joshua J Michener
*Assistant Examiner* — Michael B. Kreiner
(74) *Attorney, Agent, or Firm* — Greer, Burns & Crain, Ltd.

(57) ABSTRACT

An aircraft including at least one system rack positioned under a floor and including a series of vertical first uprights, distributed in a direction parallel to the longitudinal axis of the aircraft. The aircraft includes at least a first upper connecting system connecting at least one of the first uprights and a rail of the floor oriented parallel to the longitudinal axis. In so far as the first uprights of the system rack are not connected to the crossbeams of the floor, they can be positioned irrespective of the position of the crossbeams, and this contributes to simplifying the design of the system racks and allows these to be standardized.

11 Claims, 7 Drawing Sheets

(56) References Cited

U.S. PATENT DOCUMENTS

| | | | |
|---|---|---|---|
| 11,293,465 B2* | 4/2022 | Brindeau | B64C 1/18 |
| 11,352,119 B2* | 6/2022 | Guering | B64F 5/10 |
| 11,377,230 B2* | 7/2022 | Saint-Marc | B64D 43/00 |
| 2011/0127379 A1* | 6/2011 | Jager | B64C 1/18 |
| | | | 244/118.1 |
| 2014/0175225 A1* | 6/2014 | Durand | B64D 11/00 |
| | | | 244/129.6 |
| 2014/0175226 A1 | 6/2014 | Durand et al. | |
| 2015/0291281 A1 | 10/2015 | Burgunder et al. | |
| 2016/0304186 A1 | 10/2016 | Guering et al. | |

* cited by examiner

AIRCRAFT COMPRISING AT LEAST ONE SYSTEM RACK CONNECTED TO A FLOOR RAIL BY AT LEAST ONE CONNECTING SYSTEM

CROSS-REFERENCES TO RELATED APPLICATIONS

This application claims the benefit of the French patent application No. 2113823 filed on Dec. 17, 2021, the entire disclosures of which are incorporated herein by way of reference.

FIELD OF THE INVENTION

The present application relates to an aircraft comprising at least one system rack connected to a floor rail by at least one connecting system.

BACKGROUND OF THE INVENTION

According to one embodiment visible in FIGS. 1 and 2, an aircraft comprises a fuselage 10 and a floor 12 dividing the inside of the fuselage 10 into an upper zone 14 and a lower zone 16. In one configuration, the floor 12 comprises crossbeams 18 positioned in planes perpendicular to the longitudinal axis X of the aircraft.

The aircraft comprises a plurality of system racks 20 positioned in an avionics bay 22 situated at the front of the lower zone of a nose cone, under the flight deck. In one arrangement, the system racks 20 are arranged in two rows, one on each side of the longitudinal axis X, so as to delimit an aisle 24.

Each system rack 20 is connected by at least one lower connecting system 26 to the structure of the fuselage 10 and by at least one upper connecting system 28 to at least one crossbeam 18 of the floor 12. Each upper connecting system 28 comprises a connecting rod 28.1 which has a first end 28.2 connected by a first ball-jointed articulation to the system rack 20 and a second end 28.3 connected by a second ball-jointed articulation to one of the crossbeams 18 of the floor 12.

According to an embodiment visible in FIG. 2, each system rack 20 comprises a substantially vertical front face F20, parallel to the longitudinal axis X and oriented towards said longitudinal axis X, a substantially vertical rear face F20', parallel to the longitudinal axis X and opposite to the front face F20, as well as vertical uprights 30, positioned on the front and rear faces F20, F20', and distributed along the length of the system rack 20, uprights being situated at each longitudinal end of the front and rear faces F20, F20'. According to this embodiment, the first end 28.2 of each connecting rod 28.1 is connected to an upright 30 and the second end 28.3 is connected to a crossbeam 18 of the floor 12. For the correct transmission of load, the upright 30, the connecting rod 28.1 and the crossbeam 18 are positioned substantially in the same transverse plane. As a result, it is necessary to take the spacing between the crossbeams 18 into account when designing a system rack 20 so that its uprights 30 are correctly positioned. Because the crossbeams 18 are not spaced in the same way from one model of aircraft to another, the system racks 20 cannot have standardized dimensions and each system rack 20 has to be designed according to the aircraft in which it is to be installed.

The present invention seeks to overcome all or some of the disadvantages of the prior art.

SUMMARY OF THE INVENTION

The subject of the invention is an aircraft comprising:
a fuselage which has a longitudinal axis and a structure,
a floor which comprises crossbeams which are parallel to one another and positioned in transverse planes, and rails which are parallel to one another and to the longitudinal axis,
at least one system rack positioned under the floor, and which comprises a series of vertical first uprights, distributed in a direction parallel to the longitudinal axis,
at least a lower connecting system connecting the system rack and the structure of the fuselage,
at least an upper connecting system connecting the system rack and the floor.

According to the invention, at least a first upper connecting system connects at least one of the first uprights and a rail of the floor.

Thus, the first uprights of the system rack can be positioned irrespective of the positions of the crossbeams. This solution makes it possible to simplify the design of the system racks and to standardize them.

According to another feature, the first upper connecting system comprises a connecting rod which has a first end connected by a first articulation to the system rack and a second end connected by a second articulation to the rail, the first articulation having a first pivot axis oriented in a substantially horizontal first direction, the second articulation having a second pivot axis oriented in a substantially horizontal second direction perpendicular to the first direction.

According to another feature, the first articulation comprises:
a first bracket, secured to one of the first uprights and which has at least a first flange pressed against the first upright and connected thereto by at least one fixing and a second flange positioned approximately in a transverse plane,
a yoke, secured to the connecting rod, and which has two branches between which the second flange of the first bracket is positioned,
the first pivot axis of the first articulation passing through the second flange of the first bracket and the branches of the yoke.

According to another feature, the second articulation comprises:
a second bracket, secured to the rail and which has at least a first flange pressed against the rail and connected thereto by at least one fixing, and a second flange positioned approximately in a longitudinal plane,
a yoke, secured to the connecting rod, and which has two branches between which the second flange of the second bracket is positioned,
the second pivot axis of the second articulation passing through the second flange of the second bracket and the branches of the yoke.

According to another feature, the first and/or second articulations are ball-jointed.

According to another feature, the aircraft comprises a longitudinal beam secured to the structure of the fuselage and positioned approximately in vertical alignment with the first uprights of the system rack and having an upper sole on which the system rack rests, as well as a web. To complement this, the lower connecting system comprises a third bracket which comprises a first flange pressed against one of the first uprights and connected thereto by at least one fixing as well as a second flange pressed against the upper sole of the longitudinal beam and connected thereto by at least one fixing.

According to another feature, the lower connecting system comprises a fourth bracket positioned in line with the third bracket, and which has a first flange pressed against the web of the longitudinal beam and connected thereto by at least one fixing, as well as a second flange pressed against the sole of the longitudinal beam and connected thereto by at least one fixing.

According to another feature, the second flanges of the third and fourth brackets as well as the sole of the longitudinal beam are connected by the same fixings.

According to another feature, the system rack comprises at least a first lower longitudinal reinforcement connecting the first uprights. To complement this, the third brackets of the various first uprights of the system rack and the first lower longitudinal reinforcement form the one same single component part.

According to another feature, the system rack comprises a lower platform.

To complement this, the first lower longitudinal reinforcement, the third brackets and the lower platform form the one same single component part.

According to another feature, the aircraft comprises at least a second upper connecting system, configured to react loads essentially made up of at least one longitudinal component and which is connected to a rail or to a crossbeam of the floor.

BRIEF DESCRIPTION OF THE DRAWINGS

Further features and advantages will become apparent from the following description of the invention, which description is given solely by way of example and with reference to the attached drawings among which.

DETAILED DESCRIPTION OF THE PREFERRED EMBODIMENTS

Figure 1:
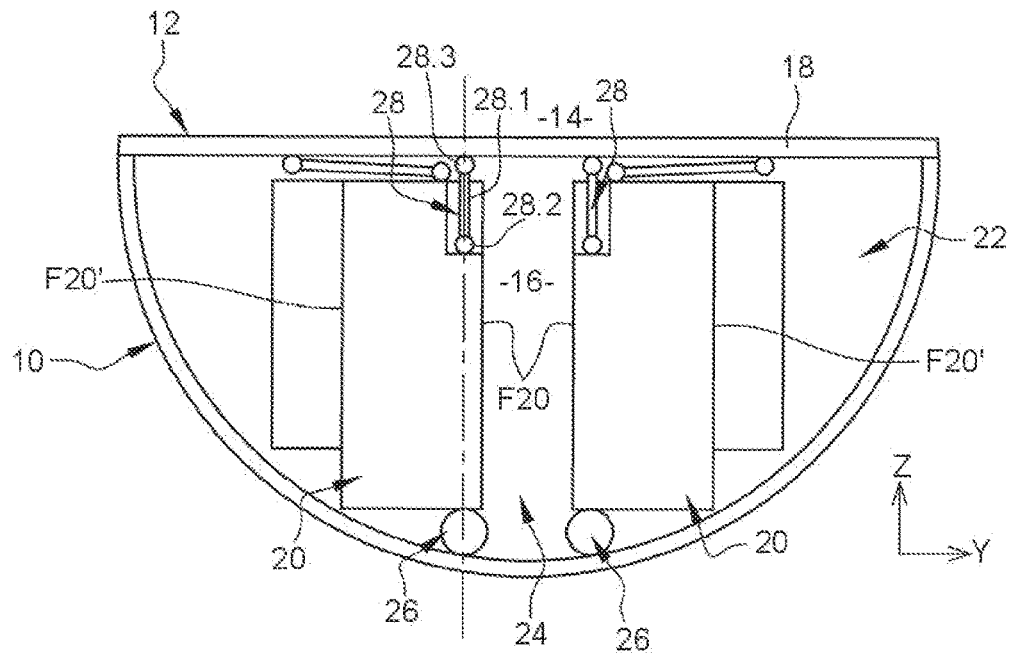
FIG. 1 is a schematic face-on view of an avionics bay illustrating one embodiment of the prior art.
Figure 2:
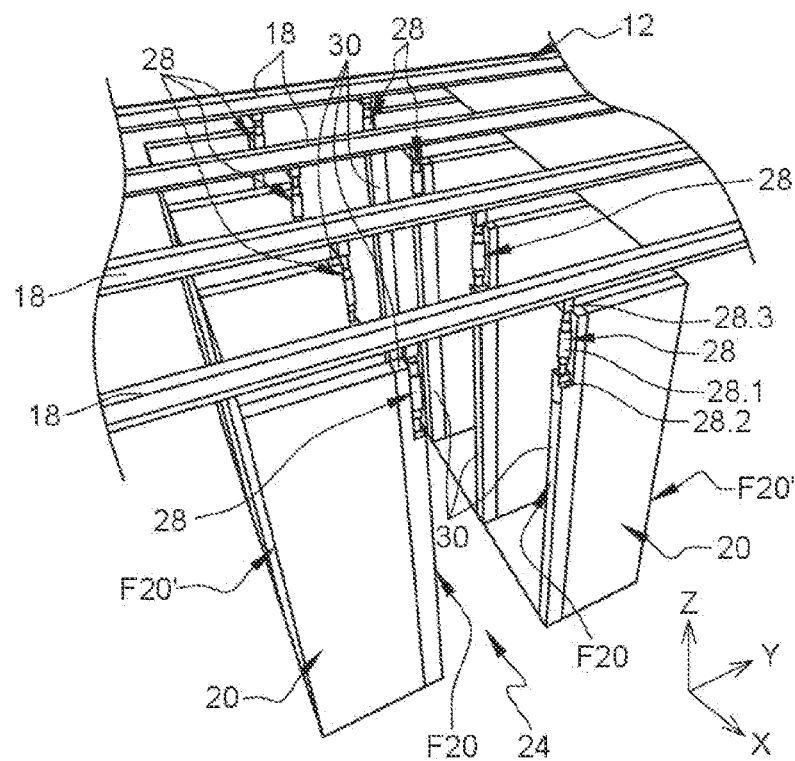
FIG. 2 is a schematic perspective view of part of an avionics bay illustrating an embodiment of the prior art.
Figure 3:
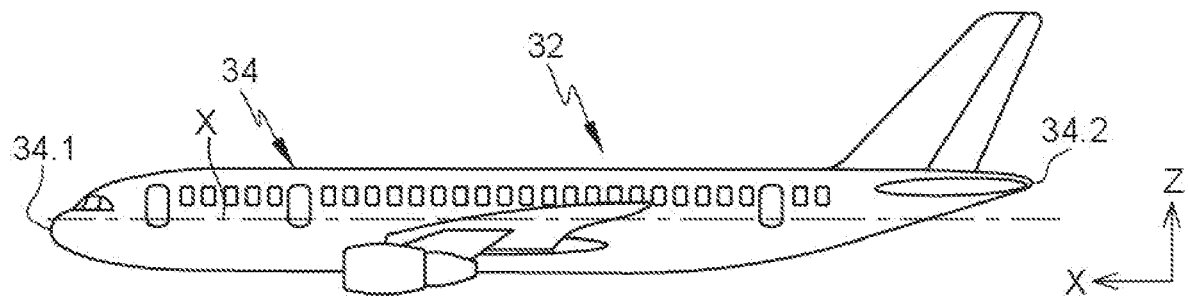
FIG. 3 is a side view of an aircraft.

As illustrated in FIG. 3, an aircraft 32 comprises a fuselage 34 which extends from a nose cone 34.1 as far as a tail cone 34.2.

For the remainder of the description, a longitudinal axis X of the aircraft 32 corresponds to the central axis which is horizontal when the aircraft 32 is on the ground, and which extends from the nose cone 34.1 to the tail cone 34.2 of the aircraft 32. A longitudinal direction is a direction parallel to the longitudinal axis X. A vertical longitudinal plane is a vertical plane passing through the longitudinal axis X. A transverse plane is a plane perpendicular to the longitudinal axis X.

Figure 6:
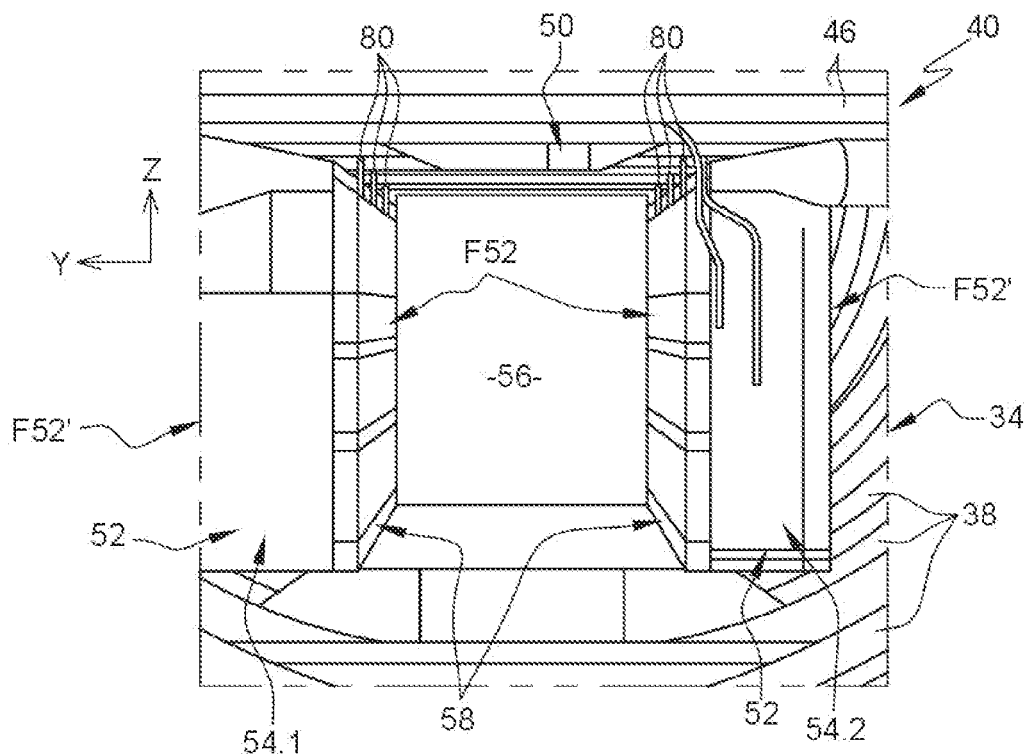
FIG. 6 is a view, from the rear of an aircraft, of an avionics bay illustrating one embodiment of the invention.

The fuselage 34 comprises a structure comprising transverse reinforcements also known as frames 38 (visible in FIG. 6) positioned in transverse planes and longitudinal reinforcements, known as stringers, which are approximately parallel to the longitudinal axis X.

Figure 4:
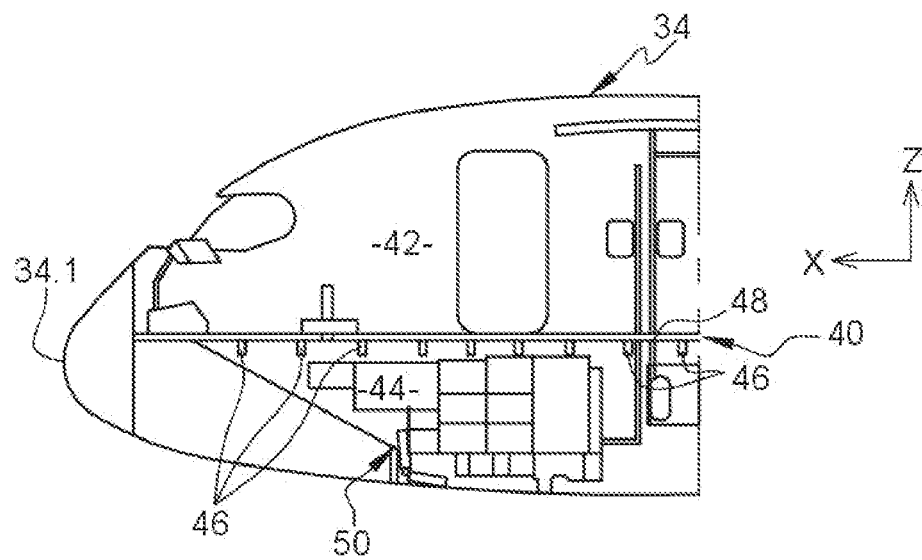
FIG. 4 is a longitudinal section through a front part of the aircraft visible in FIG. 3.

As illustrated in FIG. 4, the aircraft 32 comprises a substantially horizontal floor 40 which divides the inside of the fuselage 34 into an upper zone 42 and a lower zone 44. In one configuration, the floor 40 comprises crossbeams 46 which are parallel to one another and positioned in transverse planes, as well as rails 48 which are parallel to one another and to the longitudinal axis X, are positioned on the crossbeams 46 and are connected thereto. Each rail 48 is a profile section which has an I-shaped, J-shaped or some other shape of cross section. In general, the rails 48 are spaced apart by a spacing smaller than the spacing between the crossbeams 46. These rails are notably used for fixing the seats of the passenger cabin.

The lower zone 44 comprises, at the nose end of the fuselage, an avionics bay 50.

The aircraft 32 comprises at least one system rack 52 (also known as an avionics rack) positioned in the avionics bay 50.

In one arrangement, the aircraft 32 comprises several system racks 52 arranged in two rows 54.1, 54.2 oriented parallel to the longitudinal axis X and one on each side thereof so as to delimit an aisle 56.

From a geometric standpoint, each system rack 52, which is approximately parallelepipedal, has, amongst others, a front face F52 and a rear face F52' which is substantially parallel to the front face F52. According to the arrangement visible in FIG. 5, the front face F52 of the system racks 52 is oriented towards the aisle 56. It is largely uncovered so as to allow access to the inside of the system rack. The rear face F52' is oriented towards the fuselage 34.

Each system rack 52 has a first dimension referred to as the length (dimension measured in a horizontal plane in a first direction parallel to the longitudinal axis X in this instance), a second dimension referred to as the width (dimension measured in a horizontal plane in a second direction perpendicular to the first direction and to the longitudinal axis X in this instance) that is smaller than the first dimension, and a third dimension referred to as the height (dimension measured in a vertical direction).

Each system rack 52 comprises a lower platform 58, a first series of vertical first uprights 60 positioned at the front face F52 and a second series of vertical second uprights 62 (visible in FIG. 5) positioned at the rear face F52'. Each upright 60, 62 has a lower end connected to the lower platform 58, as well as an upper end.

Figure 5:
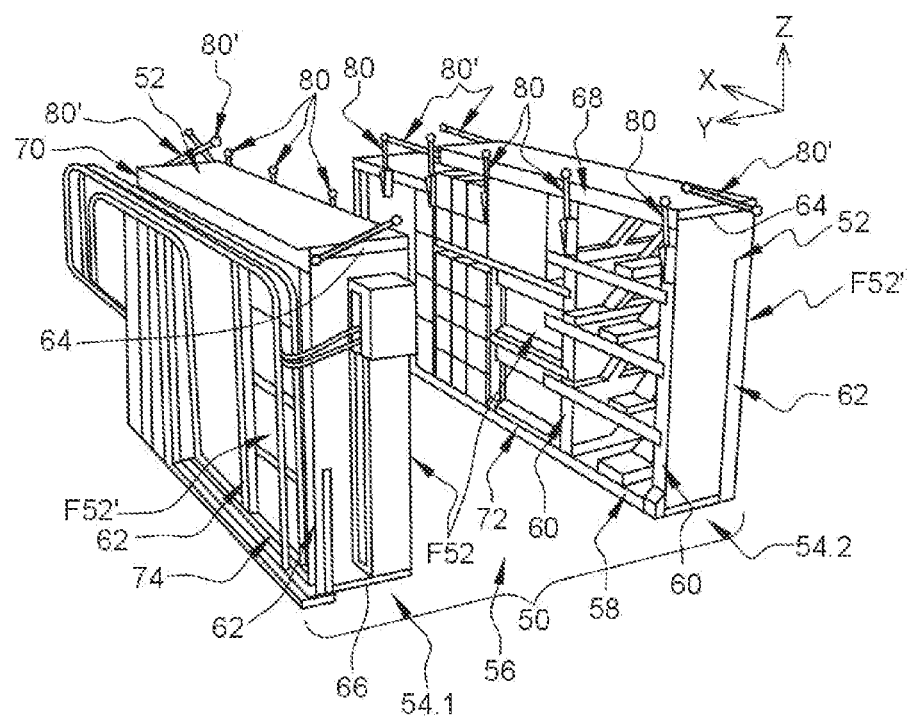
FIG. 5 is a perspective view of system racks illustrating one embodiment of the invention.

According to a configuration illustrated in FIG. 5, each system rack 52 comprises upper crossmembers 64 connecting the upper end of each first upright 60 to the upper end of a second upright 62, lower crossmembers 66 connecting the lower end of each first upright 60 to the lower end of a second upright 62, at least a first upper longitudinal reinforcement 68 connecting the upper ends of the first uprights 60, at least a second upper longitudinal reinforcement 70 connecting the upper ends of the second uprights 62, at least a first lower longitudinal reinforcement 72 connecting the lower ends of the first uprights 60 as well as at least a second lower longitudinal reinforcement 74 connecting the lower ends of the second uprights 62. Thus, the system rack 52 comprises several vertical frames positioned in transverse planes and each comprising a pair of first and second uprights 60, 62 which are connected by a pair of upper and lower crossmembers 64, 66, said transverse frames being connected by first and second upper and lower longitudinal reinforcements.

The system rack 52 may comprise intermediate crossmembers each connecting a first upright 60 and a second upright 62 and positioned between the upper and lower ends of the first and second uprights 60, 62, as well as intermediate longitudinal reinforcements pairwise connecting first and second uprights 60, 62.

Figure 10:
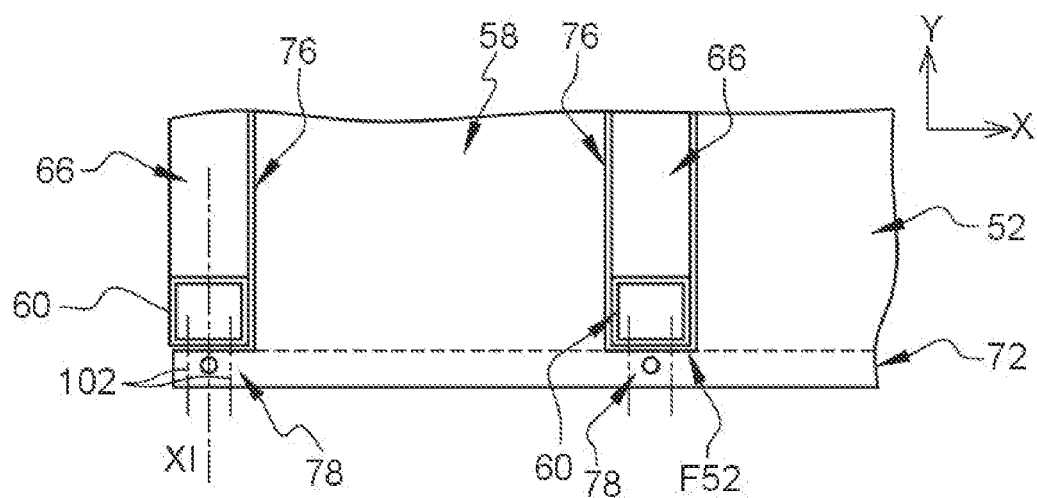
FIG. 10 is a view from above of part of a lower platform of a system rack illustrating one embodiment of the invention.

According to a configuration visible in FIG. 10, the lower platform 58 of the system rack 52 comprises, for each transverse frame, a cutout 76 in which the lower part of the transverse frame is positioned. With this configuration, the first and second lower longitudinal reinforcements 72, 74 are integrated into the lower platform 58 of the system rack 52.

The system rack 52 may comprise lateral faces and/or partitions each connecting first and second uprights 60, 62 positioned in the one same transverse plane, an upper face connecting the first and second upper longitudinal reinforcements 68, 70 and extending over the entire length of the system rack 52, as well as shelves.

Each of the first and second uprights 60, 62 has a square or rectangular cross section. Each first upright 60 comprises a first face F60, the first faces F60 of the first uprights 60 of the system rack 52 being substantially coplanar and forming the front face F52 of the system rack.

Of course, the invention is not restricted to these embodiments for the system rack 52. Whatever the embodiment, the system rack 52 comprises a series of vertical first uprights 60 distributed in a direction parallel to the longitudinal axis X.

The aircraft comprises, for each system rack 52, at least one lower connecting system 78 connecting the system rack 52 and the structure of the fuselage 34, as well as at least one upper connecting system 80, 80' connecting the system rack 52 and the floor 40.

According to one configuration, the aircraft comprises first upper connecting systems 80 configured to react loads essentially made up of a vertical component, and second upper connecting systems 80' configured to react loads essentially made up of at least one longitudinal component (parallel to the longitudinal axis X) and/or transverse component (perpendicular to the longitudinal axis X).

According to one feature of the invention, at least one first upper connecting system 80 connects at least one of the first uprights 60 and a rail 48 of the floor 40.

According to a first arrangement, all the first uprights 60 are connected to a rail 48 of the floor 40 by a first upper connecting system 80. According to a second arrangement, at least a first upright 60 is connected to a rail 48 of the floor 40 by a first upper connecting system 80 and at least a first upright 60 is connected to a crossbeam 46 of the floor 40 by another connecting system.

Because the rails 48 extend over at least the entire length of the system rack 52, the first uprights 60 can be positioned irrespective of the positions of the crossbeams 46. This solution makes it possible to simplify the design of the system racks 52 and to standardize them.

Figure 7:
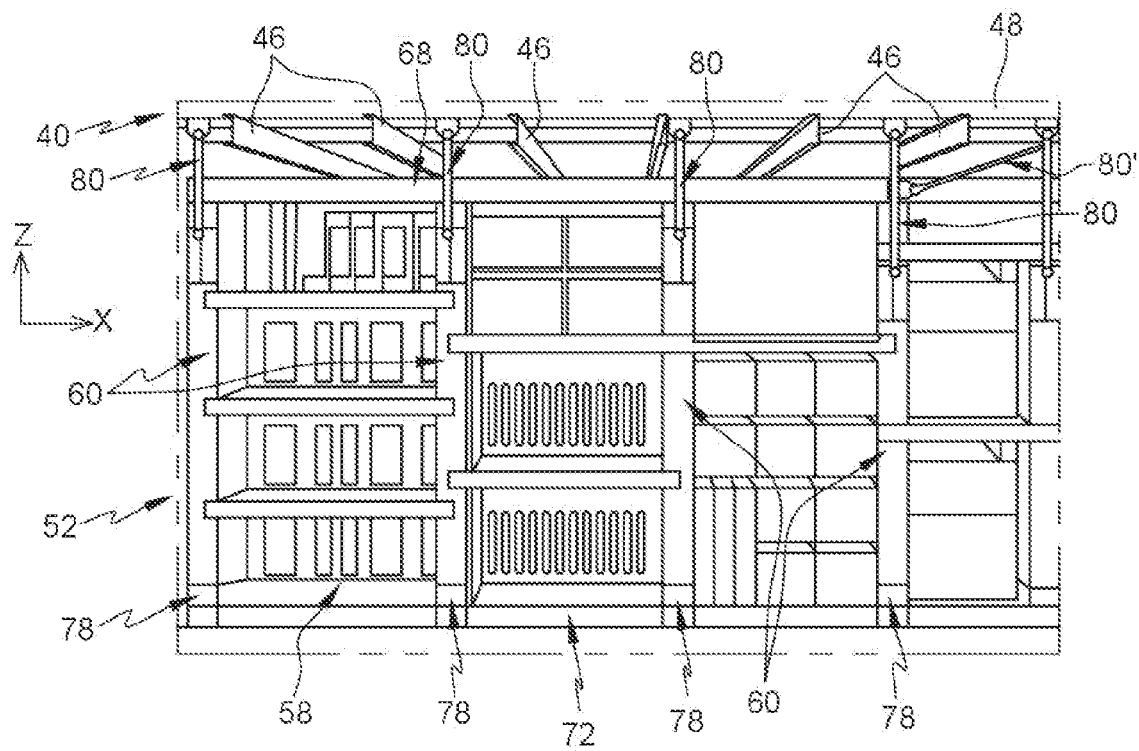
FIG. 7 is a side view of the avionics bay visible in FIG. 6.

The second upper connecting systems 80' may be connected to the first uprights 60. However, in a configuration visible in FIGS. 5 and 7, they may be connected to one of the first and second upper longitudinal reinforcements 68, 70 or to any other part of the system rack 52. These second upper connecting systems 80' may be connected indifferently either to a rail 48 or to a crossbeam 46 of the floor 40.

Figure 12:
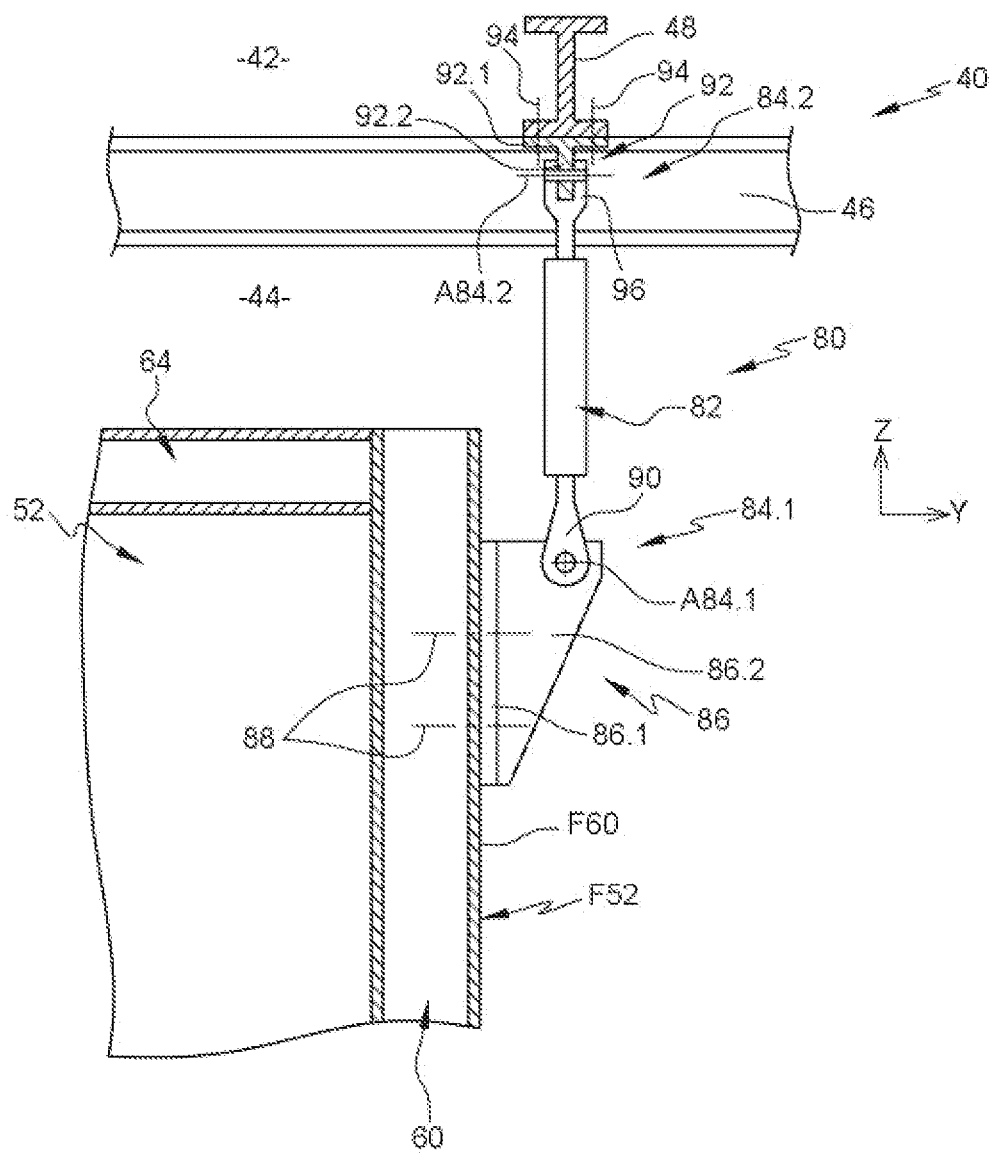
FIG. 12 is a face-on view of an upper connecting system illustrating one embodiment of the invention.

According to an embodiment visible in FIG. 12, each first upper connecting system 80 comprises a connecting rod 82 which has a first end connected by a first articulation 84.1 to the system rack 52 as well as a second end connected by a second articulation 84.2 to the floor 40.

According to another feature, for each first upper connecting system 80, the first articulation 84.1 has a first pivot axis A84.1 oriented in a substantially horizontal first direction and the second articulation 84.2 has a second pivot axis A84.2 oriented in a substantially horizontal second direction perpendicular to the first direction. This solution makes it possible to avoid the connecting rods 82 of the first upper connecting systems 80 being stressed in the longitudinal and transverse directions.

According to an arrangement illustrated in FIG. 12, the first pivot axis A84.1 of the first articulation 84.1 is approximately parallel to the longitudinal axis X and the second pivot axis A84.2 of the second articulation 84.2 is approximately perpendicular to the longitudinal axis X.

The first and/or second articulations 84.1, 84.2 may be ball-jointed.

According to a first embodiment, the first articulation 84.1 comprises:
- a first bracket 86, secured to an upright 60 and which has at least a first flange 86.1 pressed against the first face F60 of the first upright 60 and connected thereto by at least one fixing 88, as well as a second flange 86.2 positioned approximately in a transverse plane,
- a yoke 90, secured to the connecting rod 82, and having two branches between which the second flange 86.2 of the first bracket 86 is positioned,
- a first pivot axis A84.1 passing through the second flange 86.2 and the branches of the yoke 90.

The second articulation 84.2 comprises:
- a second bracket 92, secured to the rail 48, and which has at least a first flange 92.1 pressed against the rail 48 and connected thereto by at least one fixing 94, as well as a second flange 92.2 positioned approximately in a longitudinal plane,
- a yoke 96, secured to the connecting rod 82, and having two branches between which the second flange 92.2 of the second bracket 92 is positioned,
- a second pivot axis A84.2 passing through the second flange 92.2 and the branches of the yoke 96.

Of course, the invention is not restricted to these embodiments for the first and second articulations 84.1, 84.2.

The lower connecting systems 78 connecting the system rack 52 and the structure of the fuselage 34 may be identical to those of the prior art.

Figure 11:
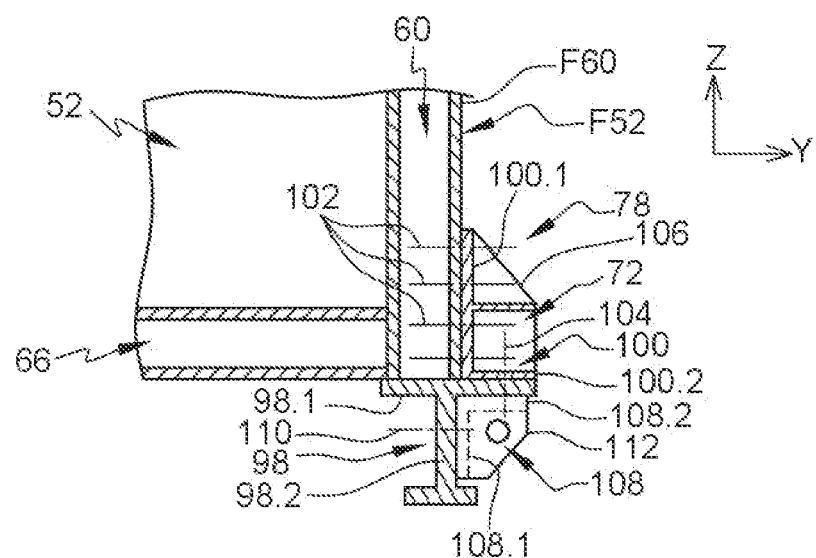
FIG. 11 is a section on XI-XI of FIG. 10.

At the rear face F52', the system rack 52 may be connected directly to the frames 38 of the structure of the fuselage. Because the system rack 52 is spaced away from the frames 38 of the structure of the fuselage in vertical alignment with its front face F52, the structure of the fuselage 34 comprises a longitudinal beam 98 (parallel to the longitudinal axis X) secured to the frames 38 and positioned approximately in vertical alignment with the first uprights 60 of the system rack 52. According to a configuration visible in FIG. 11, the longitudinal beam 98 has an upper sole 98.1 on which the system rack 52, notably the first uprights 60 thereof, rests, as well as a web 98.2.

According to one embodiment, the aircraft comprises a lower connecting system 78 for each first upright 60 and which comprises a third bracket 100 (visible in FIGS. 8 to 11). This third bracket 100 comprises a first flange 100.1 pressed against the first face F60 of the first upright 60 and connected thereto by at least one fixing 102, as well as a second flange 100.2 pressed against the upper sole 98.1 of the longitudinal beam 98 and connected thereto by at least one fixing 104. To improve its mechanical characteristics, the third bracket 100 has at least one rib 106, notably a network of ribs.

To improve the transmission of load between each first upright 60 and the longitudinal beam 98, each lower connecting system 78 positioned in line with a first upright 60 comprises a fourth bracket 108, positioned in line with the third bracket 100, and which has a first flange 108.1 pressed against the web 98.2 of the longitudinal beam 98 and connected thereto by at least one fixing 110, as well as a second flange 108.2 pressed against the sole 98.1 of the longitudinal beam 98, more particularly against the underside face thereof, and connected thereto by at least one fixing. In one arrangement, the second flanges 100.2, 108.2 of the third and fourth brackets 100, 108, as well as the flange 98.1 of the longitudinal beam 98 are connected by the same fixings 104.

To improve the mechanical characteristics thereof, this fourth bracket 108 comprises at least one rib 112 connecting the first and second flanges 108.1, 108.2.

Figure 8:
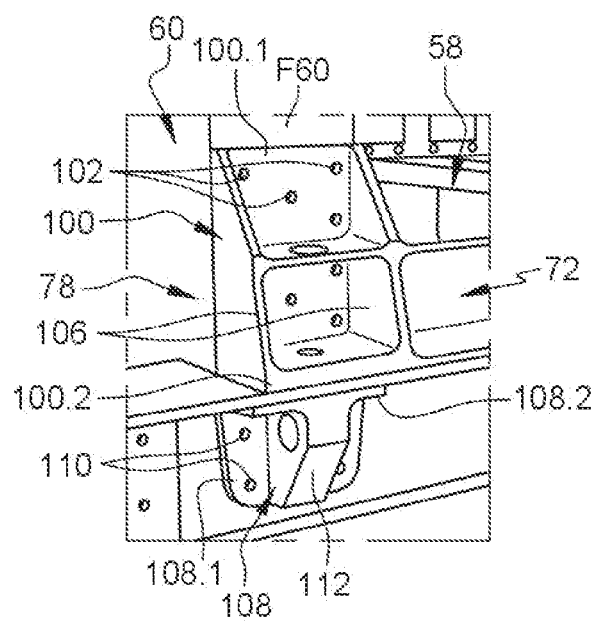
FIG. 8 is a perspective view of a lower connecting system illustrating a first embodiment of the invention.
Figure 9:
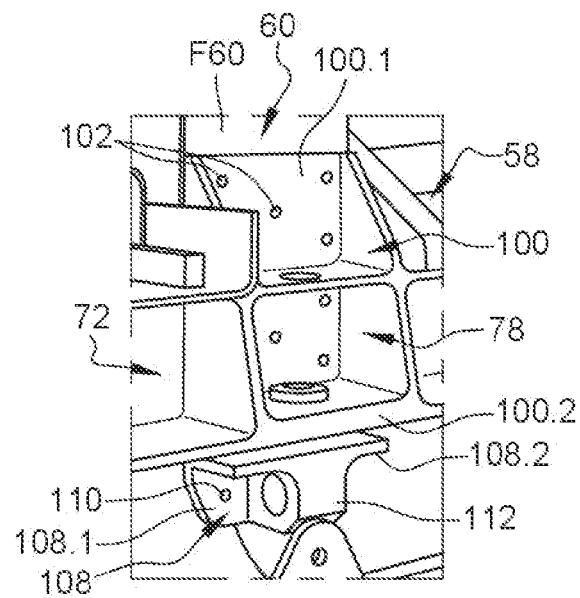
FIG. 9 is a perspective view of a lower connecting system illustrating a second embodiment of the invention.

According to an embodiment visible in FIGS. 8 and 9, the third brackets 100, connecting the first uprights 60 of the system rack 52 to the structure of the fuselage 34, are secured to the first lower longitudinal reinforcement 72. In one configuration, the first lower longitudinal reinforcement 72 and the third brackets 100 form the one same single component part. The first lower longitudinal reinforcement 72, the third brackets 100 and the lower platform 58 of the system rack 52 may form the one same single component part.

Of course, the invention is not restricted to these embodiments for the lower platform 58 and the lower connecting systems 78.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a fuselage which has a longitudinal axis and a structure,
   a floor which comprises crossbeams which are parallel to one another and positioned in transverse planes, and rails which are parallel to one another and to the longitudinal axis,
   at least one system rack positioned under the floor, and which comprises a series of vertical first uprights, distributed in a direction parallel to the longitudinal axis,
   at least a lower connecting system connecting the system rack and the structure of the fuselage,
   at least an upper connecting system connecting the system rack and the floor,
   wherein at least a first upper connecting system connects at least one of the first uprights and a rail of the floor.

2. The aircraft according to claim 1, wherein the first upper connecting system comprises
   a connecting rod which has a first end connected by a first articulation to the system rack, and a second end connected by a second articulation to the rail,
      the first articulation having a first pivot axis oriented in a substantially horizontal first direction, and
      the second articulation having a second pivot axis oriented in a substantially horizontal second direction, perpendicular to the first direction.

3. The aircraft according to claim 2, wherein the first articulation comprises:
   a first bracket, secured to one of the first uprights and which has at least a first flange pressed against the first upright and connected thereto by at least one fixing and a second flange positioned approximately in a transverse plane,
   a yoke, secured to the connecting rod, and which has two branches between which the second flange of the first bracket is positioned,
   the first pivot axis of the first articulation passing through the second flange of the first bracket and the branches of the yoke.

4. The aircraft according to claim 2, wherein the second articulation comprises:
   a second bracket, secured to the rail and which has at least a first flange pressed against the rail and connected thereto by at least one fixing, and a second flange positioned approximately in a longitudinal plane,
   a yoke, secured to the connecting rod, and which has two branches between which the second flange of the second bracket is positioned,
   the second pivot axis of the second articulation passing through the second flange of the second bracket and the branches of the yoke.

5. The aircraft according to claim 2, wherein at least one of the first or second articulations are ball-jointed.

6. The aircraft according to claim 1,
   wherein the aircraft comprises a longitudinal beam secured to the structure of the fuselage and positioned approximately in vertical alignment with the first uprights of the system rack and having an upper sole on which the system rack rests as well as a web, and
   wherein the lower connecting system comprises a third bracket which comprises a first flange pressed against one of the first uprights and connected thereto by at least one fixing as well as a second flange pressed against the upper sole of the longitudinal beam and connected thereto by at least one fixing.

7. The aircraft according to claim 6, wherein the lower connecting system comprises a fourth bracket positioned in line with the third bracket and which has a first flange pressed against the web of the longitudinal beam and connected thereto by at least one fixing, as well as a second flange pressed against the sole of the longitudinal beam and connected thereto by at least one fixing.

8. The aircraft according to claim 7, wherein the second flanges of the third and fourth brackets, as well as the sole of the longitudinal beam, are connected by the same fixings.

9. The aircraft according to claim 6,
wherein the system rack comprises at least a first lower longitudinal reinforcement connecting the first uprights, and
wherein the third brackets of the various first uprights of the system rack and the first lower longitudinal reinforcement form the one same single component part.

10. The aircraft according to claim 9,
wherein the system rack comprises a lower platform, and
wherein the first lower longitudinal reinforcement, the third brackets and the lower platform form a one same single component part.

11. The aircraft according to claim 1, wherein the aircraft comprises at least a second upper connecting system, configured to react loads essentially made up of at least one longitudinal component and which is connected to a rail or to a crossbeam of the floor.

\* \* \* \* \*